United States Patent
Voelker et al.

(10) Patent No.: US 11,238,345 B2
(45) Date of Patent: Feb. 1, 2022

(54) LEGENDRE MEMORY UNITS IN RECURRENT NEURAL NETWORKS

(71) Applicant: Applied Brain Research Inc., Waterloo (CA)

(72) Inventors: Aaron Russell Voelker, Stittsville (CA); Christopher David Eliasmith, Waterloo (CA)

(73) Assignee: Applied Brain Research Inc., Waterloo (CA)

( * ) Notice: Subject to any disclaimer, the term of this patent is extended or adjusted under 35 U.S.C. 154(b) by 0 days.

(21) Appl. No.: 17/049,943

(22) PCT Filed: Mar. 6, 2020

(86) PCT No.: PCT/CA2020/050303
§ 371 (c)(1),
(2) Date: Oct. 22, 2020

(87) PCT Pub. No.: WO2020/176994
PCT Pub. Date: Sep. 10, 2020

(65) Prior Publication Data
US 2021/0089912 A1  Mar. 25, 2021

Related U.S. Application Data

(60) Provisional application No. 62/814,767, filed on Mar. 6, 2019, provisional application No. 62/844,090, filed on May 6, 2019.

(51) Int. Cl.
*G06N 3/08* (2006.01)
*G06N 3/063* (2006.01)

(52) U.S. Cl.
CPC ............ *G06N 3/08* (2013.01); *G06N 3/063* (2013.01)

(58) Field of Classification Search
None
See application file for complete search history.

(56) References Cited

U.S. PATENT DOCUMENTS

2020/0272815 A1* 8/2020 Cao .................. G06N 3/049
2020/0394520 A1* 12/2020 Kruglov ............ G06N 3/063

OTHER PUBLICATIONS

Mall ("Application of Legendre Neural Network for solving ordinary differential equations") (Year: 2015).*
Voelker et al., "Improving Spiking Dynamical Networks: Accurate Delays, Higher-Order Synapses, and Time Cells," in 30.3 Neural Computation 569-609 (2018). (Year: 2018).*
(Continued)

*Primary Examiner* — Kamran Afshar
*Assistant Examiner* — Ryan C Vaughn
(74) *Attorney, Agent, or Firm* — Elan IP Inc.

(57) ABSTRACT

Neural network architectures, with connection weights determined using Legendre Memory Unit equations, are trained while optionally keeping the determined weights fixed. Networks may use spiking or non-spiking activation functions, may be stacked or recurrently coupled with other neural network architectures, and may be implemented in software and hardware. Embodiments of the invention provide systems for pattern classification, data representation, and signal processing, that compute using orthogonal polynomial basis functions that span sliding windows of time.

12 Claims, 5 Drawing Sheets

(56) References Cited

OTHER PUBLICATIONS

Chesnokov, V.N. "Fast training analog approximator on the basis of Legendre polynomials" Proceedings of International Workshop on Neural Networks for Identification, Control, Robotics and Signal/Image Processing, Venice, Aug. 23, 1996 (Aug. 23, 1996), pp. 299-304, retrieved from https://ieeexplore.IEEE org/document/542772 on Jun. 6, 2020 (Jun. 6, 2020). * whole document, in particular: sections 2-3, figures 2, 7, 8.

Yang, Y. et al. "A novel improved extreme learning machine algorithm in solving ordinary differential equations by Legendre neural network methods" Advances in Difference Equations, a SpringerOpen Journal, Dec. 19, 2018 (Dec. 19, 2018), retrieved from https://doi.org/1 0.1186/s13662-018-1927-x on Jun. 6, 2020 (Jun. 6, 2020).

\* cited by examiner

LEGENDRE MEMORY UNITS IN RECURRENT NEURAL NETWORKS

This application claims priority to provisional application No. 62/814,767, filed Mar. 6, 2019 and provisional application No. 62/844,090, filed May 6, 2019, the contents of which are herein incorporated by reference.

TECHNICAL FIELD

The invention relates generally to artificial intelligence and deep learning, and more particularly to a recurrent neural network architecture that may be implemented in software and in hardware.

BACKGROUND

Deep learning has undoubtedly brought about many rapid and impressive advances to the field of artificial intelligence. Due to its black-box nature, neither domain expertise nor understanding of the neural network's internal function are required in order to achieve state-of-the-art performance on a large number of important problems, including: image recognition, speech recognition, natural language understanding, question answering, and language translation (see Y. LeCun, Y. Bengio, and G. Hinton, Deep learning. Nature, vol. 521, no. 7553, pp. 436-444, May 2015). The basic recipe is as follows: install a software library for deep learning, select a network architecture, set its hyperparameters, and then train using as much data as the hardware (e.g., graphics processing unit) can hold in memory.

Deep learning architectures, such as the multi-layer perceptron, excel at constructing static vector functions that generalize to new examples by automatically discovering the "latent representations" (i.e., hidden features) that are most relevant to the task at hand. However, the opacity of its optimization procedure comes as a double-edged sword: while it is easy to apply deep learning to many problems with minimal hand-engineering, it is unclear even to experts what effect most hyperparameter changes will have in advance on overall performance.

Despite its breakthroughs, the field is well-aware that a feed-forward architecture is incapable of learning relationships that span arbitrarily across the input data in time, which is necessary for tasks involving video, speech, and other sequential time-series data with long-range temporal dependencies. Regardless of the depth of the network, a feed-forward network will always have some finite input response, which leaves a finite "memory" of previous inputs within the state of the network. In other words, the functions that are computable with such a network cannot access inputs that go beyond the depth of the network. The most general solution to overcome this problem is to introduce recurrent connections into the network, which transmit current state information back to itself, thus allowing the network to capture information about previous inputs and reuse it in the future. These networks are called Recurrent Neural Networks (RNNs).

The RNN is the most computationally powerful brand of neural network that we know how to physically implement. By using recurrent connections to persist state information through time, thus endowing the network with an internal memory, RNNs are able to compute functions outside the computational class afforded by deep feed-forward networks: dynamical systems—functions whose state evolves nonlinearly according to the history of its inputs. This enables the network to exploit patterns in the input that span time along arbitrary temporal scales.

Specifically, RNNs serve as a universal approximator to any finite-dimensional, causal, dynamical system in the discrete-time domain (see A. M. Schäfer and H. G. Zimmermann, Recurrent neural networks are universal approximators. In International Conference on Artificial Neural Networks, Springer, pp. 632-640, September 2006) and in the continuous-time domain (see K. Funahashi and Y. Nakamura, Approximation of dynamical systems by continuous time recurrent neural networks. Neural Networks, vol. 6, no. 6, pp. 801-806, November 1992). In practice, RNNs are often the best model for tasks that involve sequential inputs, such as recognizing speech, translating language, processing video, generating captions, and decoding human emotions.

A longstanding challenge with RNNs pertains to the difficulty in training initially random recurrent weights such that they are able to exploit long-range temporal dependencies (see Y. Bengio, P. Simard, and P. Frasconi, Learning long-term dependencies with gradient descent is difficult. IEEE Transactions on Neural Networks, vol. 5, no. 2, pp. 157-166, March 1994). Many architectural solutions have been proposed, with the most historically successful being the Long Short-Term Memory (LSTM; see S. Hochreiter and J. Schmidhuber, Long short-term memory. Neural Computation, vol. 9, no. 8, pp. 1735-1780, November 1997). A variety of more recent, yet closely related, alternatives also exist, for instance the Gated Recurrent Unit (GRU; see J. Chung, C. Gulcehre, K. Cho, and Y. Bengio, Empirical evaluation of gated recurrent neural networks on sequence modeling. arXiv:1412.3555, December 2014) and Non-Saturating Recurrent Unit (NRU; see S. Chandar, C. Sankar, E. Vorontsov, S. E. Kahou, and Y. Bengio, Towards non-saturating recurrent units for modelling long-term dependencies. In Proceedings of the AAAI Conference on Artificial Intelligence, vol. 33, no. 1, pp. 3280-3287, July 2017).

The LSTM, GRU, NRU, and other related alternatives, are all specific RNN architectures that aim to mitigate the difficulty in training RNNs, by providing methods of configuring the connections between nodes in the network. These architectures typically train to better levels of accuracy than randomly initialized RNNs of the same size. Nevertheless, these architectures are presently incapable of learning temporal dependencies that span more than about 100-5,000 time-steps, which severely limits the scalability of these architectures to applications involving longer input sequences. There thus remains a need for improved RNN architectures that can be trained to accurately maintain longer (i.e., longer than 100-5,000 steps in a sequential time-series) representations of temporal information, which motivates the proposed Legendre Memory Unit (LMU).

SUMMARY OF THE INVENTION

In one embodiment of the invention, there is disclosed a method for generating recurrent neural networks having Legendre Memory Unit (LMU) cells including defining a node response function for each node in the recurrent neural network, the node response function representing state over time, wherein the state is encoded into one of binary events or real values, each node having a node input and a node output; defining a set of connection weights with each node input; defining a set of connection weights with each node output; defining one or more LMU cells having a set of recurrent connections defined as a matrix that determines node connection weights based on the formula:

$$A = [a]_{ij} \in \mathbb{R}^{q \times q}$$

$$\text{where } a_{ij} = (2i+1)\begin{cases} -1 & i < j \\ (-1)^{i-j+1} & i \geq j \end{cases}$$

where q is an integer determined by the user, i and j are greater than or equal to zero.

In one aspect of the invention, the set of input connection weights are defined as a matrix that determines node connection weights based on the formula: $B=[b]_i \in \mathbb{R}^{q \times 1}$ where $b_i=(2i+1)(-1)^i$.

In another aspect of the invention, the LMU node connection weights are determined based on the equation:

$$f(A;\theta,t)$$

where $f$ is a function of A, $\theta$ is a predetermined parameter and t is time.

In another aspect of the invention, the predetermined parameter is one of selected by a user or determined using the output of a node in the neural network.

In another aspect of the invention, the LMU node connection weights are determined based on the equation:

$$\bar{f}(A;\theta,t,\Delta t)$$

where $f$ is a function of A, $\theta$ is a predetermined parameter, t is time, and $\Delta t$ is a predetermined parameter.

In another aspect of the invention, each of the predetermined parameters is one of selected by a user or determined using the output of the neural network.

In another aspect of the invention, one or more connection weights from node outputs are determined by evaluating Legendre polynomials.

In another aspect of the invention, the LMU cells are stacked, wherein each LMU cell is connected to the next using either a connection weight matrix or another neural network.

In another aspect of the invention, one or more LMU cells include connections to the inputs and from the outputs of other network architectures selected from LSTM cells, GRU cells, NRU cells, other LMU cells, multi-layer perceptrons, sigmoidal layers, and other linear or nonlinear layers.

In another aspect of the invention, the network is trained as a neural network by updating a plurality of its parameters.

In another aspect of the invention, the network is trained as a neural network by fixing one or more parameters while updating the remaining parameters.

According to another embodiment of the invention, there is provided a system for pattern classification, data representation, or signal processing in neural networks, the system including one or more input layers presenting a vector of one or more dimensions, wherein each dimension is provided to the network either by external input or by using previous outputs from the network; one or more intermediate layers coupled via weight matrices to at least one of the input, other intermediate, or output layers; one or more output layers generating a vector representation of the data presented at the input layer or computing a function of those data at one or more discrete points in time or continuously over time; wherein the system generates a recurrent neural network as herein described.

According to another embodiment of the invention, there is provided a circuit implemented in hardware with one or more recurrent connections that determine node connection weights as herein described.

BRIEF DESCRIPTION OF THE DRAWINGS

The invention is illustrated in the accompanying drawings which are meant to be exemplary and not limiting, in which like references are intended to refer to like or corresponding parts, and in which.

DETAILED DESCRIPTION OF THE INVENTION

Having summarized the invention above, certain exemplary and detailed embodiments will now be described below, with contrasts and benefits over the prior art being more explicitly described.

It will be apparent to one of skill in the art that other configurations, hardware, etc. may be used in any of the foregoing embodiments of the products, methods, and systems of this invention. It will be understood that the specification is illustrative of the present invention and that other embodiments suggest themselves to those skilled in the art. All references cited herein are incorporated by reference.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

In this invention, neural network architectures, with connection weights determined using Legendre Memory Unit (LMU) equations, are trained while optionally keeping the determined weights fixed. Networks may use spiking or non-spiking activation functions, may be stacked or recurrently coupled with other neural network architectures, and may be implemented in software and hardware. Embodiments of the invention provide systems for pattern classification, data representation, and signal processing, that compute using orthogonal polynomial basis functions that span sliding windows of time. Recurrent neural networks are well known in the art and their description and operation are assumed to be known in this application. The invention provides for an improved method and system by which recurrent network node weights are determined using Legendre Memory Unit (LMU) approaches and algorithms. Each node having an LMU approach applied is also referred to herein as an LMU cell.

Neural network architectures, with connection weights determined using Legendre Memory Unit equations, are trained while optionally keeping the determined weights fixed. Networks may use spiking or non-spiking activation functions, may be stacked or recurrently coupled with other neural network architectures, and may be implemented in software and hardware. Embodiments of the invention provide systems for pattern classification, data representation, and signal processing, that compute using orthogonal polynomial basis functions that span sliding windows of time.

We define the LMU cell as follows. Let $q \geq 1$ be an integer, provided by the user. Let $A = [a]_{ij} \in \mathbb{R}^{q \times q}$ be a square q×q matrix ($0 \leq i, j \leq q-1$), with the following coefficients:

$$a_{ij} = (2i+1) \begin{cases} -1 & i < j \\ (-1)^{i-j+1} & i \geq j \end{cases}$$

The output of each node may be defined as follows. Let $B = [b]_i \in \mathbb{R}^{q \times 1}$ be a q×1 matrix, with the following coefficients:

$$b_i = (2i+1)(-1)^i.$$

Let θ be a parameter that is provided by the user or determined using the output of a node in the neural network.

Let t be either a continuous point in time, or a discrete point in time. For the discrete-time case, let Δt be a parameter that is provided by the user or determined using the output of a node in the neural network.

The LMU recurrent connections determine node connection weights by evaluating the following equation:

$f(A;\theta,t)$ in the continuous-time case; or $\bar{f}(A;\theta,t,\Delta t)$
   in the discrete-time case,    (1)

where $f$ is a function of A that is parameterized by θ, t, in the continuous-time case, and additionally Δt for the function $\bar{f}$ in the discrete-time case.

The LMU connection weights to node inputs are optionally determined by evaluating the following equation:

$g(B;\theta,t)$ in the continuous-time case; or $\bar{g}(B;\theta,t,\Delta t)$
   in the discrete-time case,    (2)

where g is a function of B that is parameterized by θ, t, in the continuous-time case, and additionally Δt for the function $\bar{g}$ in the discrete-time case.

The LMU connections from node outputs are optionally determined by evaluating the Legendre polynomials (see A. M. Legendre, Recherches sur l'attraction des sphéroïdes homogènes. Mémoires de Mathématiques et de Physique, présentés à l'Académie Royale des Sciences, pp. 411-435, 1782).

This approach to determining recurrent connection weights is novel in the art, and as discussed below provides an improved recurrent neural network.

Derivation of A and B Matrices

To derive equations 1 and 2, let $x \in \mathbb{R}^{q \times k}$ correspond to some subset of the state vector represented by some LMU cell, and $u \in \mathbb{R}^{1 \times k}$ correspond to some subset of the vector provided as input to the aforementioned LMU cell. Given our choice of (A, B) matrices, we define the following continuous-time dynamical system:

$$\theta \frac{dx}{dt} = Ax(t) + Bu(t). \quad (3)$$

This dynamical system represents a memory of u across a sliding time-window of length θ using the orthogonal Legendre basis with coefficients given by the state x. This provides computational benefits that are not available in any other RNN architecture.

An example of (A, B) for q=6 is the following:

$$A = \begin{pmatrix} -1 & -1 & -1 & -1 & -1 & -1 \\ 3 & -3 & -3 & -3 & -3 & -3 \\ -5 & 5 & -5 & -5 & -5 & -5 \\ 7 & -7 & 7 & -7 & -7 & -7 \\ -9 & 9 & -9 & 9 & -9 & -9 \\ 11 & -11 & 11 & -11 & 11 & -11 \end{pmatrix}$$

$$B = \begin{pmatrix} 1 \\ -3 \\ 5 \\ -7 \\ 9 \\ -11 \end{pmatrix}$$

Example of Determining Continuous-Time Recurrent and Input Weights

Equation 3 then corresponds to the following continuous-time system of q ordinary differential equations (ODEs):

$$\frac{dx}{dt} = f(A;\theta,t)x(t) + g(B;\theta,t)u(t),$$

where, for example, we define the following function to determine recurrent weights:

$$f(A;\theta,t) = \frac{A}{\theta},$$

and the following function to determine input weights:

$$g(B;\theta,t) = \frac{B}{\theta}.$$

Example of Determining Discrete-Time Recurrent and Input Weights

Equation 3 corresponds to the following discrete-time dynamical system of q ODEs, discretized to a time-step of Δt:

$$x_{t+\Delta t} = \bar{f}(A;\theta,t,\Delta t)x_t + \bar{g}(B;\theta,t,\Delta t)u_t,$$

where, for example considering zero-order hold (ZOH; see W. L. Brogan, Modern Control Theory. 3rd Edition, Pearson, October 1990) discretization, we define the following function to determine recurrent weights:

$$\bar{f}(A;\theta,t,\Delta t) = e^{A\frac{\Delta t}{\theta}}, \quad (4)$$

and the following function to determine input weights:

$$\bar{g}(B;\theta,t,\Delta t) = A^{-1}\left(e^{A\frac{\Delta t}{\theta}} - I\right)B. \quad (5)$$

Additional Considerations for Equations 1 and 2

We permit other possible definitions of $f(A; \theta, t)$ or $\bar{f}(A; \theta, t, \Delta t)$ and $g(B; \theta, t)$ or $\bar{g}(B; \theta, t, \Delta t)$ to determine the connection weights when evaluating equations 1 and 2, respectively. Examples include, but are not limited to, the use of alternative methods of numerically integrating differential equations, and transforming θ as a function of t and Δt.

Input sequences with irregular intervals (a.k.a., "unevenly spaced time series") are supported by providing Δt using an input node in the neural network.

If the output of equation 1 or 2 are constant (i.e., if none of its parameters are variable, nor depend on the outputs of any nodes in the neural network), then they only need to be evaluated once (e.g., to initialize the weights). Otherwise, they may be reevaluated whenever their parameters change.

Example of Determining Output Weights

To determine the output connection weights from one or more nodes using the Legendre polynomials, we can for example evaluate the first q polynomials using the Rodrigues' formula (see O. Rodrigues, De l'attraction des sphéroïdes, Correspondence sur l'É-cole Impériale Polytechnique. PhD Thesis, University of Paris, 1816) for the shifted Legendre polynomials:

$$\tilde{P}_i(r) = (-1)^i \sum_{j=0}^{i} \binom{i}{j}\binom{i+j}{j}(-r)^j = P_i(2r-1) \quad (6)$$

where $r \in [0,1]$, $0 \le i \le q-1$, and $P_i$ is the Legendre polynomial of order i. To provide a specific example, we state the following property:

$$u(t-\theta') \approx \sum_{i=0}^{q-1} \tilde{P}_i\left(\frac{\theta'}{\theta}\right) x_i(t).$$

For each connection projecting from the node representing $x_i$ one can choose $\theta'$ ($0 \le \theta' \le \theta$) and then set $$r = \frac{\theta'}{\theta}$$

to evaluate equation 6 to determine its weight. More generally, one may compute any function of these polynomials (e.g., integral transforms such as the Fourier transform) in order to have the output nodes approximate functions of the sliding window of u.

Figure 1:
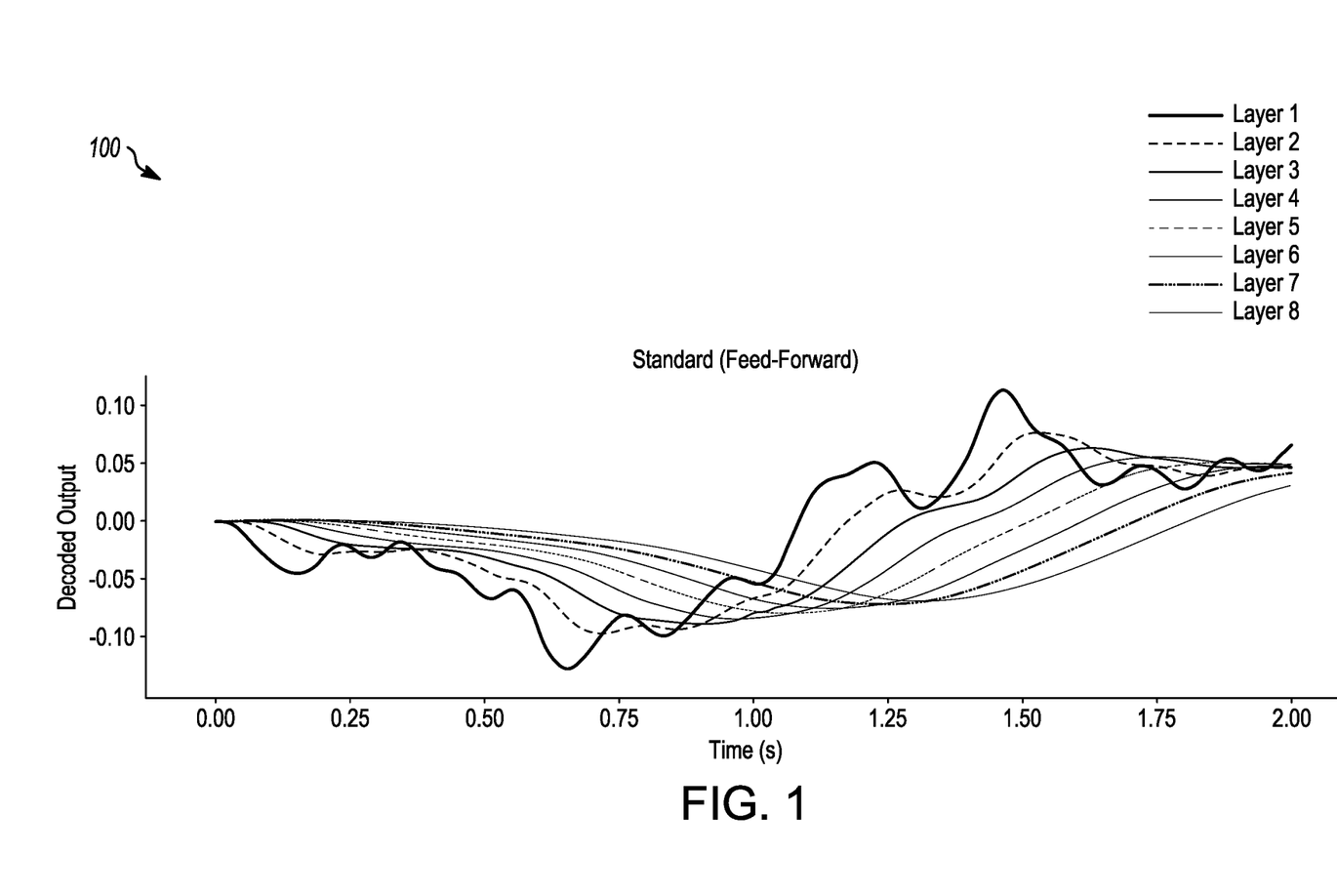
FIG. 1 illustrates an embodiment in software for a feed-forward network that determines the connection weights such that each layer encodes a more progressively lowpass filtered version of the input signal.
Figure 2:
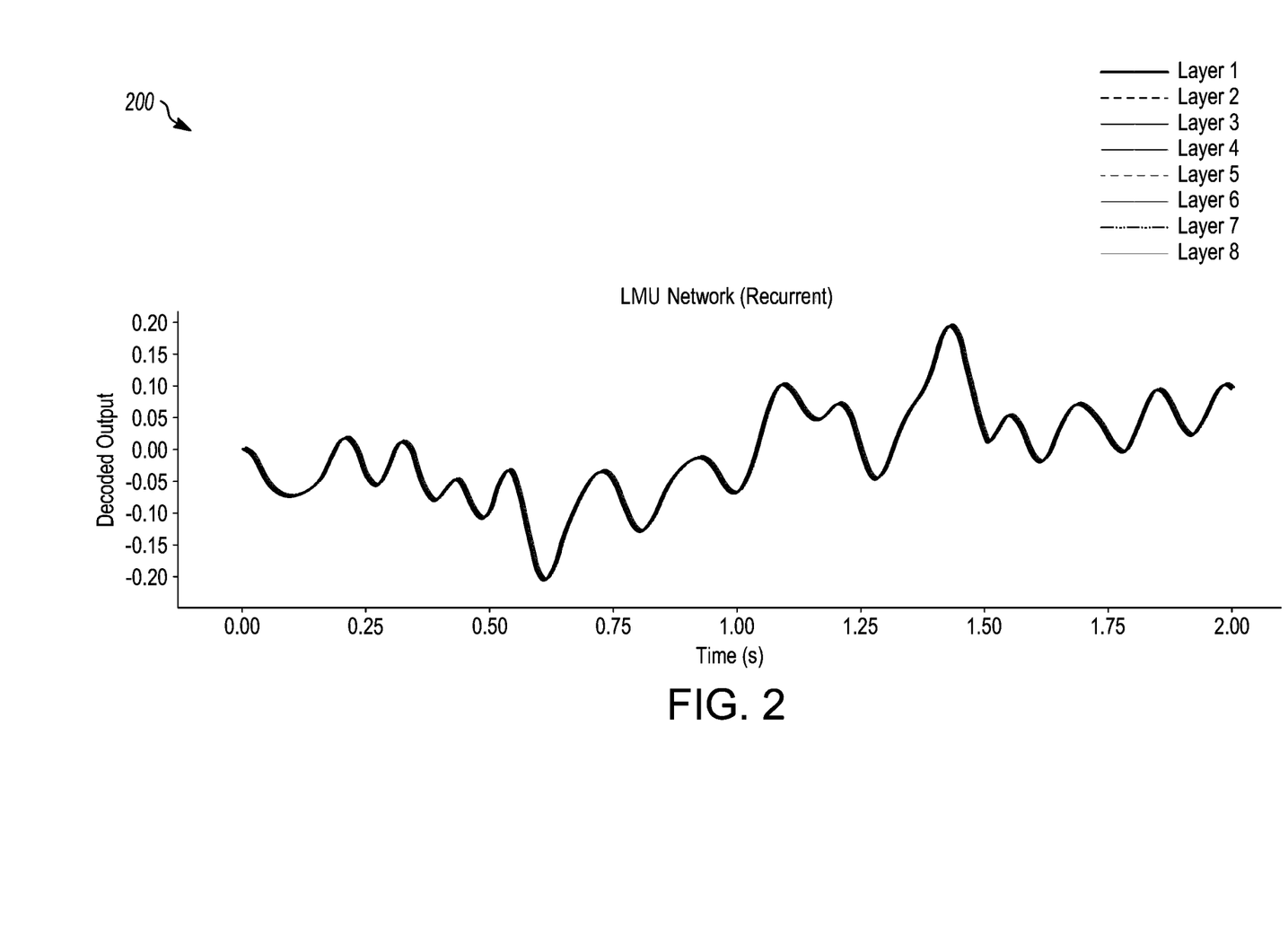
FIG. 2 illustrates an embodiment in software for a recurrent network that determines the connection weights in order to undo the effects of a lowpass filter at each layer according to embodiments of the invention.

Referring to FIGS. 1 and 2, we apply these methods to determine the output connection weights between layers by choosing $\theta'=0$. In this example, equation 4 is used to determine recurrent connection weights, and equation 5 is used to determine input connection weights. In this exemplary embodiment, a lowpass filter is harnessed to implement the integration required by the dynamical system at each layer, and the choice of $\theta'=0$ effectively undoes the temporal convolution performed by each lowpass filter. Consequently, with these LMU weights, the system propagates its input signal instantaneously through to the deepest layers as shown in chart 200 in FIG. 2. Without this choice of weights, the signal becomes progressively more lowpass filtered at each layer, as shown in chart 100 of FIG. 1.

Training the Neural Network

The parameters of the neural network can be trained using any available method, for example backpropagation through time (BPTT; see P. J. Werbos, Backpropagation through time: What it does and how to do it. Proceedings of the IEEE, vol. 78, no. 10, pp. 1550-1560, October 1990).

During training, one or more of the weight parameters produced by evaluating equation 1 or 2 or the Legendre polynomials may be held fixed. Alternatively, one or more of the weights produced by evaluating equation 1 or 2 or the Legendre polynomials may be trained. In either case, when using BPTT, the error may be backpropagated through the multiply-accumulate operations implementing the connection weights.

Likewise, the parameters of equation 1 or 2 (e.g., θ or Δt, or the parameters of the neural network determining θ or Δt) may also be trained, for example by backpropagating the error through the gradients of equation 1 or 2 (also see T. Q. Chen, Y. Rubanova, J. Bettencourt, and D. K. Duvenaud, Neural Ordinary Differential Equations. In Advances in Neural Information Processing Systems, pp. 6571-6583, December 2018).

To train the architecture with nodes consisting of spiking nonlinearities, one can use any available method of training spiking neural networks (see E. Hunsberger, C. Eliasmith, Spiking deep networks with LIF neurons, arXiv: 1510.08829, October 2015).

Software Architecture

Neural networks, with the aforementioned connection weights, may be implemented in software. Layers with one or more connection weights determined by evaluating equation 1 or equation 2 or the Legendre polynomials may be implemented using program code to create an LMU cell. These layers may be recurrently coupled with other neural network architectures. These layers may also be stacked by using connection weights or other neural networks to connect each layer to the next.

Program code is applied to input data to perform the functions described herein and to generate output information. The output information is applied to one or more output devices, in known fashion.

Each program may be implemented in a high-level procedural or object-oriented programming or scripting language, or both, to communicate with a computer system. Alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer useable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

Figure 5:
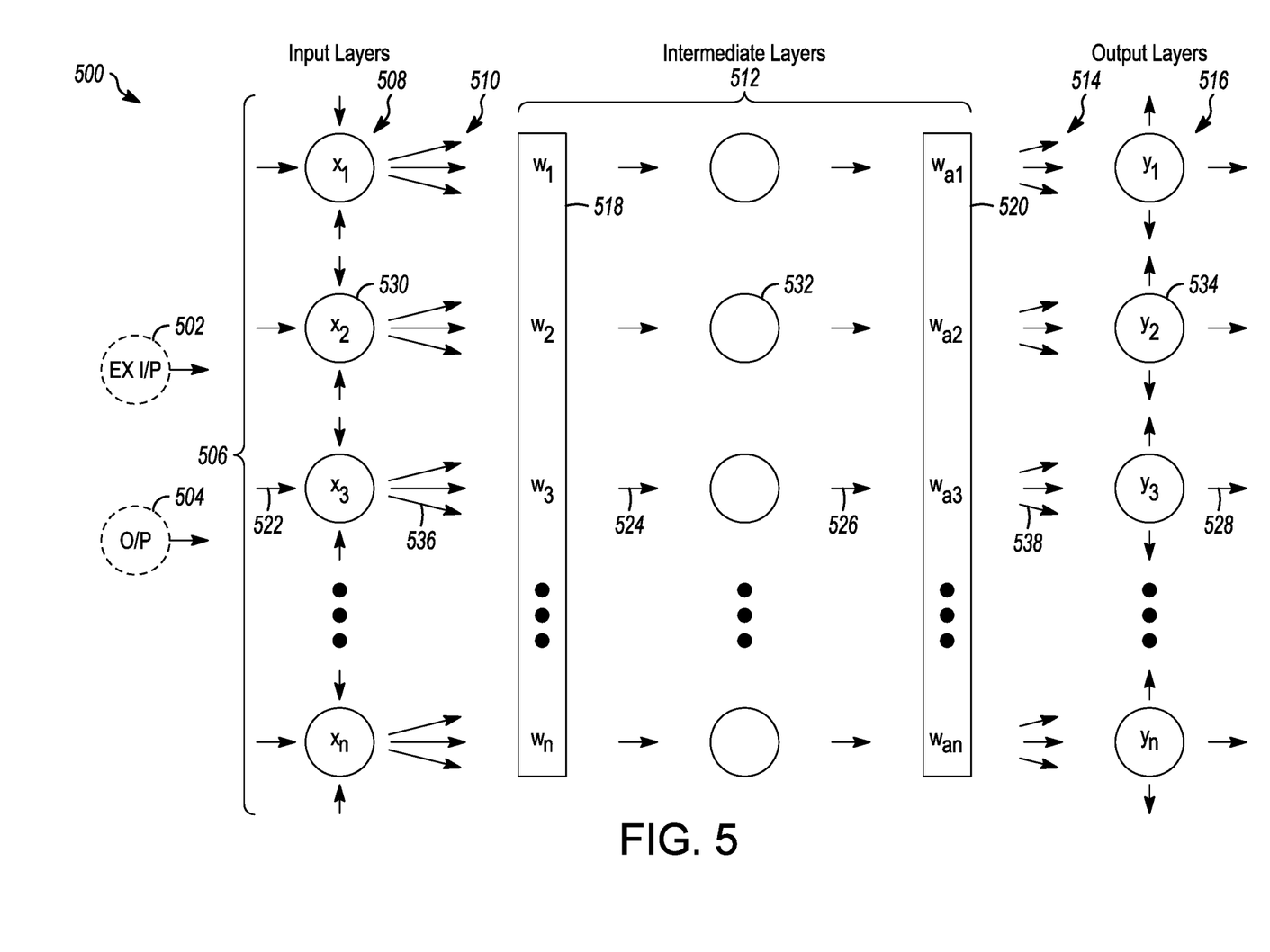
FIG. 5 is a schematic diagram of an exemplary neural network on which embodiments of the invention may be implemented.

FIG. 5 shows a schematic of a neural network 500 that may be implemented in hardware or in software, having an input layer 506, one or more intermediate layers 512 and an output layer 516. The input layer has a plurality of nodes 508, 530, 536. The output of the input layer is exemplified at 510, 536. The intermediate layers have inputs 524, recurrent nodes 532 that loop in the intermediate layer, with input weights 518 and output weights 520 coupling the nodes of each of the layers. The output of the intermediate layers is shown at 514. Recurrent weights provide the feedback loop within the nodes of the intermediate layers. The output layers have inputs 538 and nodes 534. The input to the input layer is shown as either an external input 502 or an input from a previous output 504 (derived from 528), for example, as an input 522 to each node.

Hardware Architecture

Neural networks, with the aforementioned connection weights, may be implemented in hardware including neuromorphic, digital, or analog hardware and/or hybrids thereof. More specifically, this architecture may be implemented in an application-specific integrated circuit (ASIC), field-programmable gate array (FPGA), graphics processing unit (GPU), or using configurations of analog components and other physical primitives including but not limited to transistors, and/or other parallel computing systems.

Figure 3:
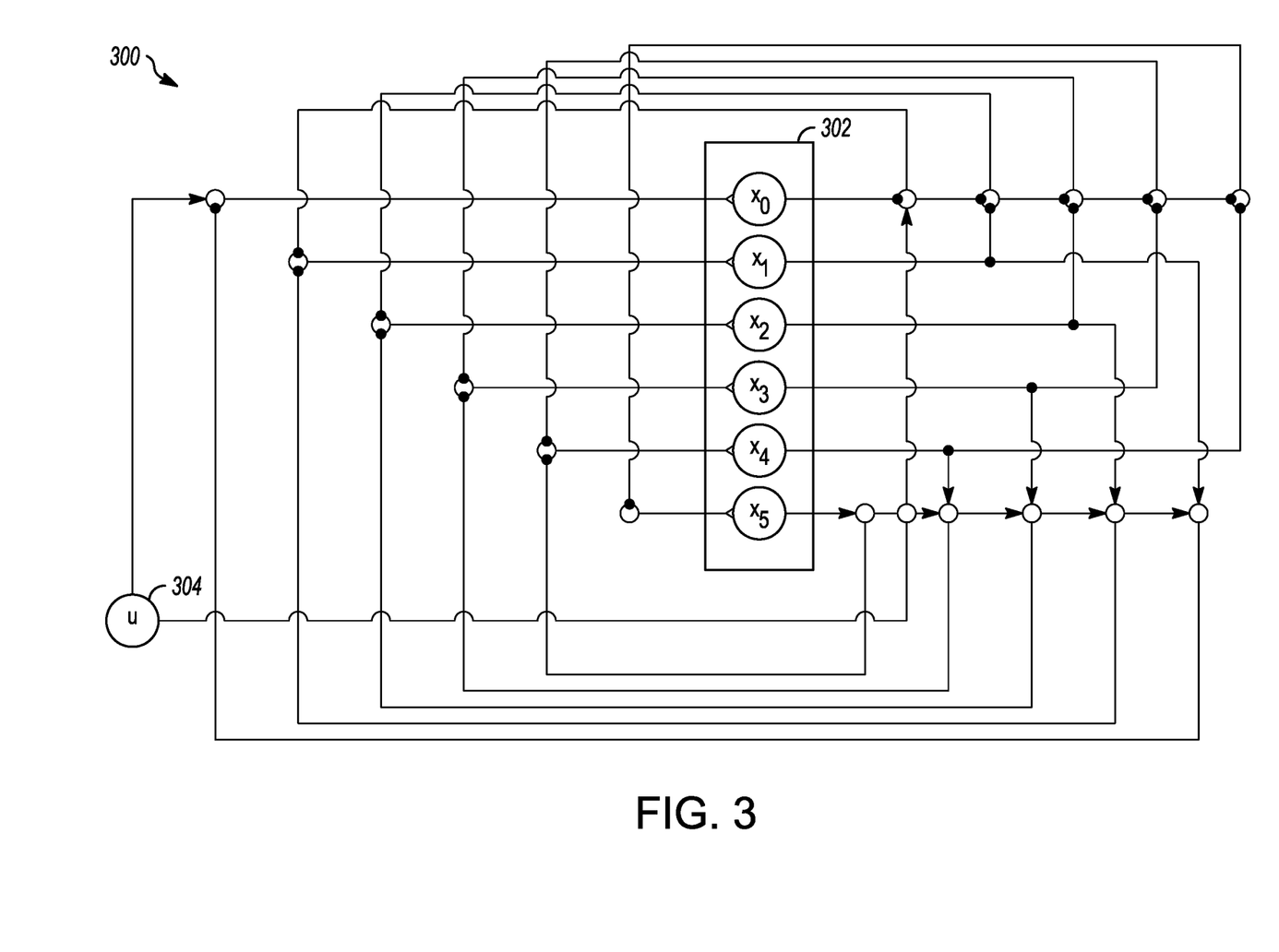
FIG. 3 illustrates a circuit embodiment that implements the continuous-time LMU equations for six-dimensional recurrent and input weights.

Referring to FIG. 3, we illustrate an exemplary circuit 300 implementing a neural network according to the invention in which connection weights are determined by evaluating equations 1 and 2 by module 302 with q=6 in the continuous-time case. Large circles correspond to each dimension of x. Small circles indicate elements that add (arrow head) or subtract (circular head) their inputs. The i'th dimension temporally integrates and scales its input (triangular head) by $(2i+1)/\theta$.

This design exploits the alternation of signs, and reuses the intermediate computations within the upper and lower triangles of A, by decomposing them into two separate cascading chains of summations that are then combined by a feedback loop. These same computations are also reused to implement the connection weights of B by supplying u 304 to the appropriate intermediate nodes.

Increasing the dimensionality of the system by one requires appending O(1) wires, adders, and state-variables, to the existing circuitry. In total, this circuit requires O(q) wires, adders, and state-variables, thus making the circuit linearly scalable in both space and time.

Simulation Results

We consider a set of experiments that are designed to evaluate the memory capacity of stacked LSTMs relative to stacked LMUs with equivalent resource usage. For this, we use an off-the-shelf Keras implementation of a stacked LSTM, and construct 3 layers with 50 cells each. Each layer is fully connected to the next, and uses all of the default settings (e.g., tan h activations). The final layer likewise consists of a tan h activation unit for each output. To evaluate the continuous-time memory capacity, the input data are white noise, bandlimited to 30 Hz, starting at 0, and normalized to an absolute range of [−1,1]. The output data are a 50-dimensional vector representing a uniform arrangement of delayed inputs between 0-0.2 s. The data set consists of 256 samples, each 1 s long. These datadata are randomly partitioned into 50% training and 50% testing. The training data are further partitioned into a separate random 25% sample used to report validation accuracy during training. Backpropagation through time is carried out using the Adam optimizer with respect to the mean-squared error (MSE) loss function. Training is parallelized using Keras and TensorFlow across four Nvidia Titan Xp GPUs (12 GB each).

We found that, for a time-step of 2 ms, backpropagation could find adequate parameters to solve this task—that is, the LSTM could in fact accurately represent the entire delay interval consisting of θ=100 time-steps with a normalized root mean-squared error (NRMSE) of about 10%. However, after decreasing the time-step, by an order of magnitude, to 200 μs—while increasing the length of data by the same factor so that the data still represent the exact same 1 s signals—the performance collapses; accuracy exponentially decays as a function of delay length across the θ=1,000 time-step window. In the worst case, the LSTM does no better than random chance, with an NRMSE of about 100%. Thus, even the most historically successful RNN architecture is clearly unable to represent increasingly long windows of time, which motivates the need for more capable RNN architectures.

We then took the exact same training code and network specification—but replaced each LSTM cell with a layer of LMU cells, where the (A, B) matrices for the continuous-time case are used (equivalent to using Euler's method to discretize the system). These matrices are shared across each cell within the same layer (akin to weight-sharing in a convolutional neural network). Finally a plurality of tan h nonlinearities (one for each cell) are included that receive input from all state-variables across the same layer, thus supporting nonlinear computations across a mixture of scaled Legendre bases. For small values of q (e.g., 9), this network has comparable resource requirements to the aforementioned LSTM.

Each LMU cell receives a one-dimensional input. The trainable parameters are the weights between layers, and the delay lengths θ within each cell. In this experiment, we disable training on the shared (A, B) weights. The overall architecture is consistent with the LSTM, as the LMU contains 50 cells stacked 3 times. The final output layer consists of linear activation units, since tan h has already been applied at this point. Finally, we set q=9, initialize the encoding weights of each cell to 1 for the first layer and 1/50 for all subsequent layers (i.e., the reciprocal of the fan-in), distribute θ values uniformly across U[100,1000], and set the weights projecting to each tan h by evaluating the Legendre polynomials at r=1, with zero weights for all other state-variables from outside the cell. In other words, each cell is initialized to approximate tan h(u[t−θ]), where u[•] is the cell's mean input. Backpropagation then trains the values of θ and learns to mix weighted nonlinear combinations of inputs and outputs between layers.

Running the exact same code and analysis, on the exact same training, validation, and testing data, reveals a dramatic difference in training time between the two approaches. We found that the stacked LMU takes 52.5 s per epoch to train, compared to 102.6 s per epoch for the stacked LSTM. Furthermore, the LMU outperforms the LSTM in every measure of accuracy. Specifically, there is a three orders of magnitude reduction in MSE across both training and validation, while converging much more rapidly to the ideal solution. The LMU architecture achieves consistent 3-4% error across the delay interval, while the equivalently-sized LSTM cell architecture approaches 100% error rates towards the end of the window. This illustrates that the stacked LSTM struggles to memorize low-frequency signals (relative to the time-step) across long intervals of time. In contrast, this task is natural for the stacked LMU, as its state represents a q-degree Legendre expansion of input history.

Backpropagation enables stacked LMUs to outperform stacked LSTMs even on tasks that are not readily supported by the initial configuration of the network. To assess the performance of each network on a continuous-time prediction task, we consider a synthetic dataset called Mackey-Glass (MG): a chaotic time-series described by a nonlinear delay-differential equation. The MG data are generated using a discrete time-delay of $\tau=17$ (each time-step is 1 unit of time). The desired output is a lookahead (prediction) of 15 time-steps in advance. We simulate this for 5,000 time-steps after removing the first 100 step transient. We repeat this 128 times, each time starting from initial random conditions. The entire dataset is then centered to have a global mean of zero. Next, the dataset is randomly split into 32 training examples, 32 validation examples, and 64 testing examples.

We use the same networks from the previous experiment, but with 4 layers of 100 cells each. For the LMU cells, we make all parameters trainable (including the A, B matrices shared across cells within the same layer). We set q=6 and initialize $\theta \in U[25,50]$ to account for the shorter time-scale of this dataset. We initialize the remaining weights using standard Keras weight initializers. All three methods are trained across 500 epochs using the Adam optimizer. In this case, to minimize overfitting, we keep only the model from the epoch that has the highest validation score.

Test performance and training times are summarized as follows. The LSTM achieves 7.084% error using 282,101 parameters while taking 50.0 seconds per training epoch. The LMU achieves 6.783% error using 270,769 parameters while taking 30.5 seconds per training epoch. Thus, the LMU outperforms the LSTM in accuracy and training time. We posit that this is because the LMU more readily supports a delay-embedding within its 6-dimensional state. Moreover, the LMU provides improved scaling through time with respect to lower frequencies across longer continuous time-intervals.

Exemplary Applications

These methods can be used to produce a system that uses neural networks for pattern classification, data representation, or signal processing in hardware and in software.

For example, automatic speech recognition (ASR) is a system for computer speech recognition that processes speech (as an audio input waveform) and produces text (as model output). The input can be preprocessed into audio features (e.g., Mel-frequency cepstral coefficients, Filter-BANK coefficients, and feature space Maximum Likelihood Linear Regression coefficients; see M. Ravanelli, T. Parcollet, and Y. Bengio, The pytorch-kaldi speech recognition toolkit. In International Conference on Acoustics, Speech and Signal Processing, IEEE, pp. 6465-6469, May, 2019) and provided to a neural network consisting of layers with connection weights determined using the LMU cell equations, with the output node of the neural network being post-processed using available methods of generating text (e.g., contextual beam search). This system can thus be trained as a neural network to build an ASR system.

Figure 4:
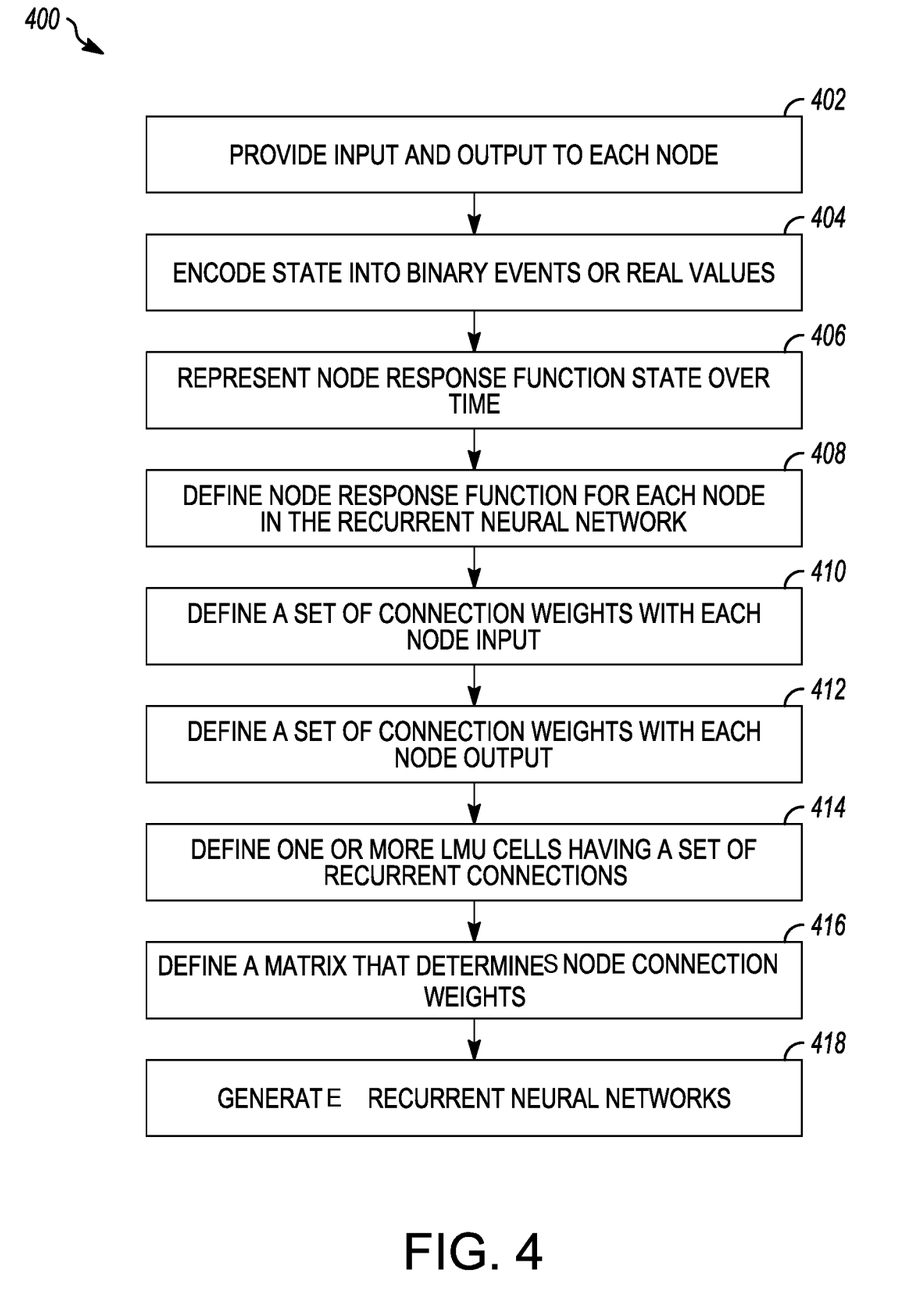
FIG. 4 illustrates a method according to one embodiment of the invention.

In FIG. 4, a method 400 is shown. The method includes the step 402 of providing input and output to each node. At step 404, the method encodes a state into binary events or real values. At step 406, the method represents a node response function state over time. At step 408, the method defines the node response function for each node in the recurrent neural network. At step 410, the method defines a set of connection weights with each node input. At step 412, the method defines a set of connection weights with each node output. At step 414, the method defines one or more LMU cells having a set of recurrent connections. At step 416, the method defines a matrix that determines node connection weights. At step 418, the method generates recurrent neural networks.

To provide another example, we consider the application of anomaly detection, which is the identification of outliers, or "anomalies," in a dataset. These data may be provided sequentially, one input vector at a time, to a neural network consisting of layers with connection weights determined using the LMU cell equations, with the output node of the neural network classifying the input as being either typical or anomalous. This system can thus be trained using available methods (e.g., using unsupervised, semi-supervised, or fully supervised learning rules) to build an anomaly detector.

We claim:

1. A method comprising:
defining, by a computer processor, a node response function for each node in a network, the node response function representing a state over time, wherein the state is encoded into one of binary events or real values, each node having a node input and a node output;
defining, by the computer processor, a set of connection weights with each node input;
defining, by the computer processor, a set of connection weights with each node output;
defining, by the computer processor, one or more Legendre Memory Unit (LMU) cells having a set of recurrent connections defined as a matrix that determines node connection weights based on the formula:

$$A=[a]_{ij} \in \mathbb{R}^{q \times q}$$

$$\text{where } a_{ij} = (2i+1) \begin{cases} -1 & i < j \\ (-1)^{i-j+1} & i \geq j \end{cases}$$

where q is an integer determined by the user, and i and j are greater than or equal to zero; and
generating, by the computer processor, a recurrent neural network comprising the node response function for each node, the set of connection weights with each node input, the set of connection weights with each node output, and the LMU cells by training the network as a recurrent neural network by updating a plurality of its parameters or by fixing one or more parameters while updating the remaining parameters.

2. The method of claim 1, wherein the set of input connection weights are defined as a matrix that determines node connection weights based on the formula: $B=[b]_i \in \mathbb{R}^{q \times 1}$ where $b_i=(2i+1)(-1)^i$.

3. The method of claim 1, wherein the LMU node connection weights are determined based on the equation:

$$f(A;\theta,t)$$

where $f$ is a function of A, $\theta$ is a predetermined parameter and t is time.

4. The method of claim 3, wherein the predetermined parameter is one of selected by a user or determined using the output of a node in the neural network.

5. The method of claim 1, wherein the LMU node connection weights are determined based on the equation:

$$\bar{\mathcal{F}}(A;\theta,t,\Delta t)$$

where $\bar{\mathcal{F}}$ is a function of A, $\theta$ is a predetermined parameter, t is time, and $\Delta t$ is a predetermined parameter.

6. The method of claim 5, wherein each of the predetermined parameters is one of selected by a user or determined using the output of a node in the neural network.

7. The method of claim 1, wherein one or more connection weights from node outputs are determined by evaluating Legendre polynomials.

8. The method of claim 1, wherein the LMU cells are stacked, wherein each LMU cell is connected to the next using either a connection weight matrix or another neural network.

9. The method of claim 1, wherein one or more LMU cells include connections to the inputs and from the outputs of other network architectures selected from the group consisting of Long Short-Term Memory cells, Gated Recurrent Unit cells, Non-Saturating Recurrent Unit cells, other LMU cells, multi-layer perceptrons, and sigmoidal layers.

10. A hardware implemented system for pattern classification, data representation, or signal processing in neural networks, the system comprising:

a processor; and
a memory containing computer-executable instructions, wherein the computer-executable instructions, when executed by the processor, cause the processor to implement:
one or more input layers presenting a vector of one or more dimensions, wherein each dimension is provided to the network either by external input or by using previous outputs from the network;
one or more intermediate layers coupled via weight matrices to at least one of the input, other intermediate, or output layers; and
one or more output layers generating a vector representation of the data presented at the input layer or computing a function of those data at one or more discrete points in time or continuously over time;
wherein
the system generates a recurrent neural network using the method of claim 1.

11. A circuit implemented in hardware with one or more recurrent connections that determine node connection weights using the method of claim 1.

12. The circuit of claim 11, wherein one or more connection weights from node outputs are determined by evaluating Legendre polynomials.

* * * * *